(12) United States Patent
Huang et al.

(10) Patent No.: US 9,035,902 B2
(45) Date of Patent: May 19, 2015

(54) ELECTRONIC DEVICE AND CONTROL METHOD THEREOF

(75) Inventors: David Huang, Taoyuan County (TW); Yung-Tsung Chen, Taoyuan County (TW); Pei-Hao Huang, Taoyuan County (TW)

(73) Assignee: HTC Corporation, Taoyuan District, Taoyuan (TW)

( * ) Notice: Subject to any disclaimer, the term of this patent is extended or adjusted under 35 U.S.C. 154(b) by 460 days.

(21) Appl. No.: 13/213,051

(22) Filed: Aug. 18, 2011

(65) Prior Publication Data
US 2012/0212447 A1   Aug. 23, 2012

(30) Foreign Application Priority Data
Aug. 19, 2010   (TW) .............................. 99127713 A

(51) Int. Cl.
*G06F 1/32* (2006.01)
*G06F 3/044* (2006.01)
*H03K 17/955* (2006.01)
*H03K 17/96* (2006.01)
*H04B 1/707* (2011.01)
*H04W 52/02* (2009.01)

(52) U.S. Cl.
CPC .............. *G06F 3/044* (2013.01); *H04W 52/027* (2013.01); *H04R 2499/11* (2013.01); *H04W 52/0254* (2013.01); *G06F 1/3231* (2013.01); *G09G 2330/021* (2013.01)

(58) Field of Classification Search
CPC .......... G09G 3/3406; G09G 2330/021; H04M 2250/22; H04M 1/605; H04N 21/4436; H04W 52/027; H04W 52/0254; G06F 1/3231; G06F 3/044; H04R 2499/11

USPC ................... 345/156, 173, 98, 102, 204, 169; 178/18.03, 18.06; 340/5.53; 379/433.01; 713/320, 323
See application file for complete search history.

(56) References Cited

U.S. PATENT DOCUMENTS 5,337,353 A * 8/1994 Boie et al. ................. 379/433.01
5,684,294 A * 11/1997 Kouhi ..................... 250/214 AL
(Continued)

FOREIGN PATENT DOCUMENTS

CN      101639748 A      2/2010
CN      101676842 A      3/2010
(Continued)

OTHER PUBLICATIONS

Office action mailed on Jun. 26, 2013 for the China application No. 201010260606.0, filing date Aug. 19, 2010, p. 1-5.

*Primary Examiner* — Michael J Eurice
(74) *Attorney, Agent, or Firm* — Winston Hsu; Scott Margo

(57) ABSTRACT

An electronic device includes a sensing unit, a charge-and-discharge circuit, and a processing circuit. The processing circuit includes a control unit, a detecting unit, a determining unit, and an executing unit. The control unit provides a plurality of periodic pulses to the sensing unit and the charge-and-discharge circuit, such that they are charged and discharged periodically and output a sensing voltage. The sensing unit detects the sensing voltage, and determines a charging time according to the sensing voltage, wherein the charging time is a time at which the sensing voltage reaches a predetermined voltage. The determining unit determines whether to trigger an interrupt request according to the charging time. The executing unit performs a designated application when the interrupt request is received.

6 Claims, 5 Drawing Sheets

(56) References Cited

U.S. PATENT DOCUMENTS

| | | | |
|---|---|---|---|
| 6,426,736 B1* | 7/2002 | Ishihara | 345/102 |
| 6,954,867 B2* | 10/2005 | Casebolt et al. | 713/323 |
| 2003/0003879 A1* | 1/2003 | Saiki et al. | 455/90 |
| 2005/0219228 A1* | 10/2005 | Alameh et al. | 345/173 |
| 2006/0114241 A1 | 6/2006 | Lin | |
| 2006/0166698 A1* | 7/2006 | Saiki et al. | 455/550.1 |
| 2007/0075965 A1* | 4/2007 | Huppi et al. | 345/156 |
| 2007/0076897 A1* | 4/2007 | Philipp | 381/74 |
| 2007/0085157 A1* | 4/2007 | Fadell et al. | 257/428 |
| 2008/0061800 A1* | 3/2008 | Reynolds et al. | 324/678 |
| 2008/0140868 A1* | 6/2008 | Kalayjian et al. | 710/8 |
| 2008/0158185 A1* | 7/2008 | Westerman | 345/173 |
| 2008/0165116 A1* | 7/2008 | Herz et al. | 345/102 |
| 2008/0219672 A1* | 9/2008 | Tam et al. | 398/130 |
| 2009/0015555 A1* | 1/2009 | Takashima et al. | 345/158 |
| 2009/0262078 A1* | 10/2009 | Pizzi | 345/169 |
| 2009/0267892 A1* | 10/2009 | Faubert | 345/156 |
| 2010/0048256 A1* | 2/2010 | Huppi et al. | 455/574 |
| 2010/0149125 A1* | 6/2010 | Klinghult et al. | 345/174 |
| 2010/0149126 A1* | 6/2010 | Futter | 345/174 |
| 2010/0201647 A1* | 8/2010 | Verweg | 345/174 |
| 2010/0321321 A1* | 12/2010 | Shenfield et al. | 345/173 |
| 2011/0086643 A1* | 4/2011 | Kalayjian et al. | 455/445 |

FOREIGN PATENT DOCUMENTS

| | | | |
|---|---|---|---|
| TW | 472493 | 1/2002 | |
| WO | WO 01/03457 A1 * | 1/2001 | H04Q 7/32 |

* cited by examiner

ELECTRONIC DEVICE AND CONTROL METHOD THEREOF

BACKGROUND OF THE INVENTION

1. Field of the Invention

The present disclosure relates to an electronic device and a control method thereof, and more particularly, to an electronic device and a control method thereof disposing a sensing unit at a position adjacent to a sound output device (e.g. a speaker or a telephone receiver) to sense whether the sensing unit receives capacitance changes caused by a touch from a user, to replace an original proximity sensor.

2. Description of the Prior Art

In the market of consumer electronics products, portable electronic devices, e.g. personal digital assistances (PDAs), mobile phones and smart phones, generally utilize touch panels as interfaces of data communication. However, as to a mobile phone, when a user uses the mobile phone to make a call, the user may erroneously trigger touch functions of a touch panel because his/her ear or face is too close to the touch panel. Such fault touches often trouble the user.

In order to reduce troubles caused by fault touches, a conventional portable electronic device usually utilizes a proximity sensor to detect a distance between the portable electronic device and an object, such as a human ear or face, to achieve a button effect which automatically turns off a touch panel and/or backlight of a display panel. However, a sensing range of the conventional proximity sensor is too small, such that positions for disposing the proximity sensor are limited. Besides, the proximity sensor is an optical element, a surface thereof must be transparent and color of a cover plate needs to be additionally considered, such that color of a housing of the portable electronic device is inconsistent, which affects artistry of the appearance. Moreover, the proximity sensor is costly, which burdens the manufacturer.

Therefore, how to improve convenience of the portable electronic device, to add additional functions to the portable electronic device, and to reduce the cost are important issues in the art.

SUMMARY OF THE INVENTION

Therefore, one of goals of the present disclosure is to provide an electronic device and a control method thereof to solve the above problems.

More precisely, one of goals of the present disclosure is to provide an electronic device, which utilizes a sensing unit together with a simple charge-and-discharge circuit and a processing unit to replace an original proximity sensor, to achieve a turn-off function of a panel.

The present disclosure discloses an electronic device, comprising a sensing unit, a charge-and-discharge circuit and a processing circuit. The sensing unit senses whether receiving a touch from a user. The charge-and-discharge circuit is coupled to the sensing unit, wherein the charge-and-discharge circuit and the sensing unit are periodically charged and discharged according to a plurality of periodic pulses, and output a sensing voltage. The processing unit is coupled to the sensing unit and the charge-and-discharge circuit, and comprises a control unit, a detecting unit, a determining unit, and an executing unit. The control unit provides the periodic pulses to the sensing unit and the charge-and-discharge circuit. The detecting unit detects the sensing voltage and decides a charging time according to the sensing voltage, wherein the charging time is a time at which the sensing voltage reaches a predetermined voltage. The determining unit is coupled to the detecting unit, for deciding whether to trigger an interrupt request according to the charging time. The executing unit executes a specific application when the interrupt request is received.

The present disclosure further discloses a method for controlling an electronic device. The electronic device comprises a sensing unit for sensing whether receiving a touch form a user, and a charge-and-discharge circuit. The method comprises the steps of providing a plurality of periodic pulses to the sensing unit and the charge-and-discharge circuit; periodically charging and discharging the charge-and-discharge circuit and the sensing circuit according to the periodic pulse, so as to output a sensing voltage; detecting the sensing voltage and determining a charging time according to the sensing voltage, wherein the charging time is a time at which the sensing voltage reaches a predetermined voltage; deciding whether to trigger an interrupt request according to the charging time; and executing a specific application when the interrupt request is received.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
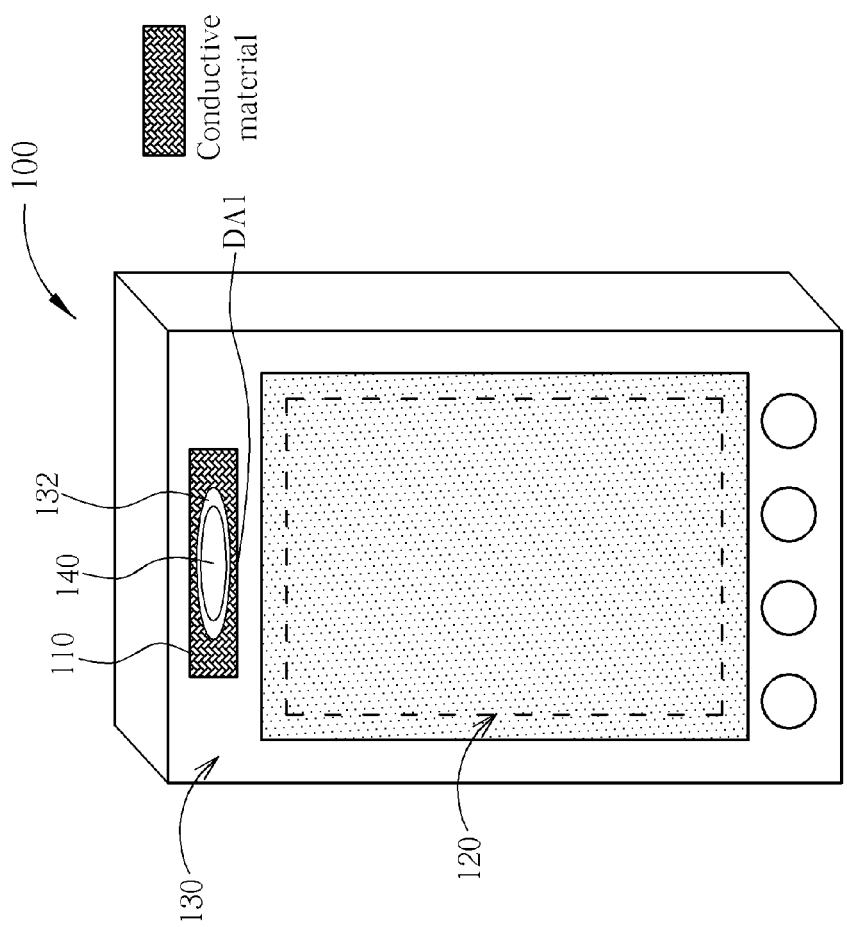
FIG. 1 illustrates a schematic diagram of an electronic device according to a first embodiment of the present invention.

Please refer to FIG. 1, which illustrates a schematic diagram of an electronic device 100 according to a first embodiment of the present invention. As shown in FIG. 1, the electronic device 100 comprises a sensing unit 110, a cover plate 120, a housing 130 and a sound output device 140. The output device 140 is used to output a sound signal, and can be realized by a speaker or a telephone receiver. The cover plate 120 is disposed on an outer surface of a display panel or a touch panel (not shown) of the electronic device 100, for protecting the electronic device 100. In this embodiment, the housing 130 comprises a containing space 132 to contain the sound output device 140, and the sensing unit 110 is implemented by a conductive layer, such as a metal sheet (e.g. a copper sheet), a conductive material, etc. The conductive layer may be stuck on or integrated into a specific area DA1 of an inner surface of the housing 130, and the specific area DA1 is adjacent to the containing space 132, as shown in FIG. 1. As a result, the sensing unit 110 senses whether a touch from a conductive object of a user, e.g. ear, face, etc., is received via direct contacts or indirect inductions.

Figure 2:
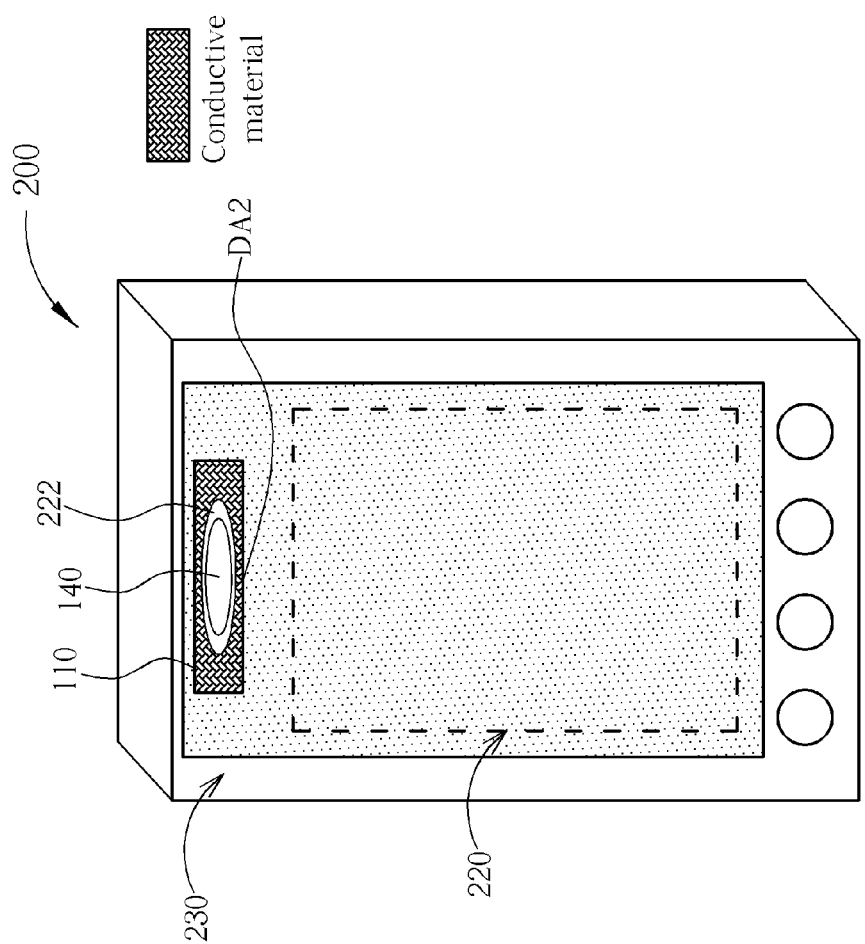
FIG. 2 illustrates a schematic diagram of an electronic device according to a second embodiment of the present invention.

Please refer to FIG. 2, which illustrates a schematic diagram of an electronic device 200 according to a second embodiment of the present invention. In the second embodiment, the electronic device 200 comprises a sensing unit 110, a cover plate 220, a housing 230 and a sound output device 140. As shown in FIG. 2, the structure of the electronic device 200 is similar to the electronic device 100 shown in FIG. 1, and the difference between the two is that the cover plate 220 of the electronic device 200 comprises a cavity 222 to form a containing space to contain the sound output device 140. The sensing unit 110 is a conductive layer, e.g. a metal sheet (e.g. a copper sheet) or a layer of any conductive material, and the conductive layer may be stuck on or integrated into a specific area DA2 of an inner surface of the cover plate 220, where the specific area DA2 is adjacent to the cavity 220, as shown in FIG. 2. Besides, since the sensing unit 110 is not an optical element, the specific area DA2 where the sensing unit 110 is disposed can be covered by a layer of any colored material, to coincide the color design of the surface of the electronic device 200 and to reach requirements of artistic appearance. As a result, the sensing unit 110 senses whether a touch from a conductive object of a user, e.g. ear, face, etc., is received via a direct contact or an indirect induction.

As can be seen from FIG. 1 and FIG. 2, the sensing unit 110 is not limited to be disposed at a specific area, but is preferably disposed at a position adjacent to the place where sound outputs, which means the best position to dispose the sensing unit 110 is adjacent to and around the sound output device 140 (e.g. the specific areas DA1 and DA2). Besides, a size and a shape of the sensing unit 110 are not limited conditions of the present invention.

Figure 3:
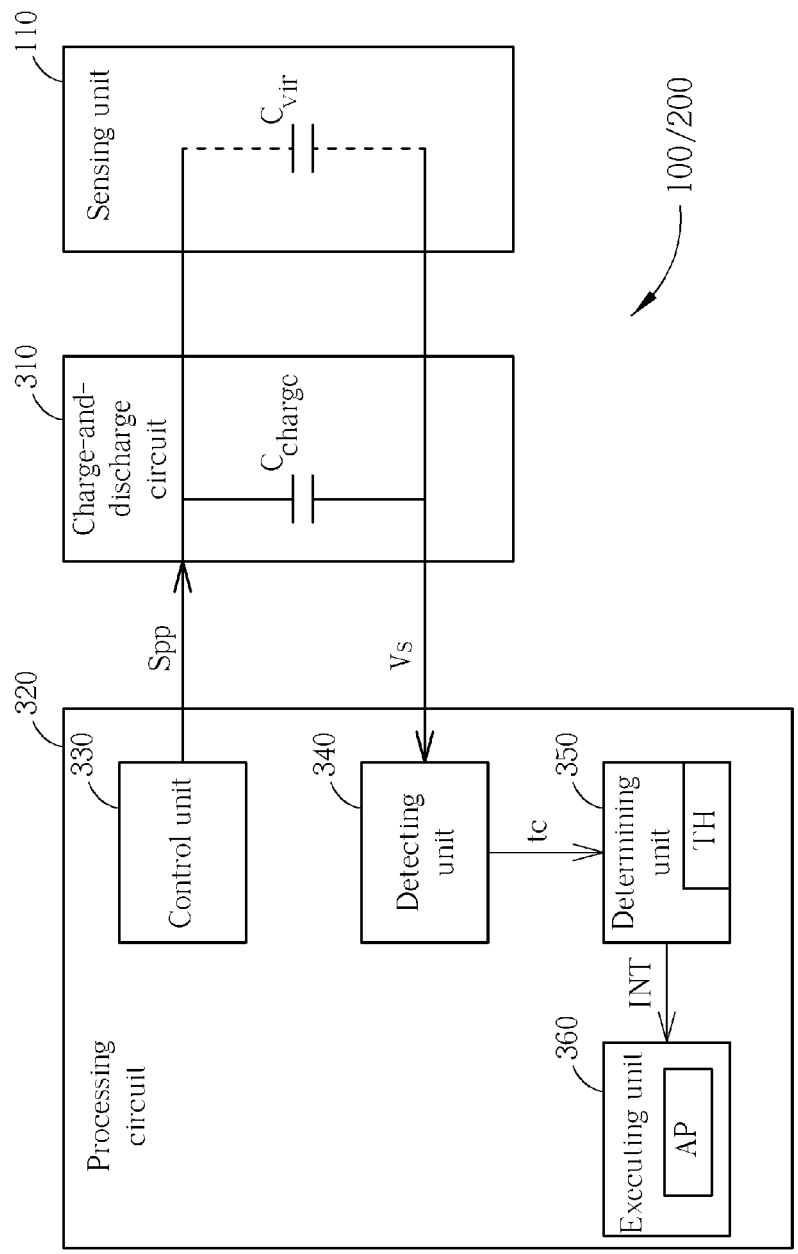
FIG. 3 illustrates a functional block diagram of an exemplary embodiment of the electronic device shown in FIG. 1 or FIG. 2.

Please jointly refer to FIG. 3 and FIG. 1 (or FIG. 2). FIG. 3 illustrates a functional block diagram of an exemplary embodiment of the electronic device 100/200 shown in FIG. 1 or FIG. 2. As shown in FIG. 3, the electronic device 100/200 comprises (but is not limited to) a sensing unit 110, a charge-and-discharge circuit 310 and a processing circuit 320. The charge-and-discharge circuit 310 is coupled to the sensing unit 110, wherein the charge-and-discharge circuit 310 and the sensing unit 110 are charged and discharged periodically according to a plurality of periodic pulses SPP, and output a sensing voltage VS. The processing circuit 320 is coupled to the sensing unit 110 and the charge-and-discharge circuit 310, and comprises a control unit 330, a detecting unit 340, a determining unit 350 and an executing unit 360. The control unit 330 provides the periodic pulses SPP to the sensing unit 110 and the charge-and-discharge circuit 310. The detecting unit 340 is used to detect the sensing voltage VS, and decide a charging time tc according to the sensing voltage VS. The charging time is a time at which the sensing voltage reaches a predetermined voltage VD (e.g. 5 Volts). The determining unit 350 is coupled to the detecting unit 340, for determining whether to trigger an interrupt request INT according to the charging time tc. Finally, the executing unit 360 is coupled to the determining unit 350, for executing an application AP when the interrupt request is received.

In this embodiment, the charge-and-discharge circuit 310 is realized by a charging capacitor Ccharge, but is not limited thereto. In other embodiments, the charge-and-discharge circuit 310 can be realized by a charging capacitor together with a resistor element. Without violating the spirit of the present disclosure, all kinds of variation of components of the charge-and-discharge circuit 310 are feasible and should be well known to those skilled in the art.

Note that, the electronic device 100/200 may be a mobile phone, a personal digital assistant (PDA), a PDA phone, a smart phone, or other kinds of portable electronic devices, but the present invention is not limited thereto. Besides, the processing circuit 320 may be realized by a central processing unit or a microprocessor, and may use a GPIO pin to receive and detect the sensing voltage VS, but the present invention is not limited thereto. Moreover, the specific application AP can be a control function for turning off a touch panel and/or backlight of a display panel. Those skilled in the art should recognize all kinds of alterations of the specific application are feasible and can be designed according to practical requirements.

Noticeably, the sensing unit 110 comprises a virtual capacitor Cvir, which has a first capacitance C1 when the sensing unit 110 does not receive a touch from a user, and has a second capacitance C2 greater than the first capacitance C1 when the sensing unit 110 receives a touch from a user, meaning that the capacitance of virtual capacitor Cvir can vary. In other words, when the sensing unit 110 does not receive a touch from a user, an equivalent capacitance of the charge-and-discharge circuit 310 and the sensing unit 110 equals Ccharge+C1. And, when the sensing unit 110 receives a touch from a user, the equivalent capacitance of the charge-and-discharge circuit 310 and the sensing unit 110 equals Ccharge+C2 (where C2>C1). Since the equivalent capacitance changes, the charging time tc, required by the sensing voltage VS to reach the predetermined voltage VD, changes. Therefore, the determining unit 350 determines whether the sensing unit 110 receives a touch from a user by the amount of the charging time tc, so as to decide whether to trigger the interrupt request INT.

Figure 4:
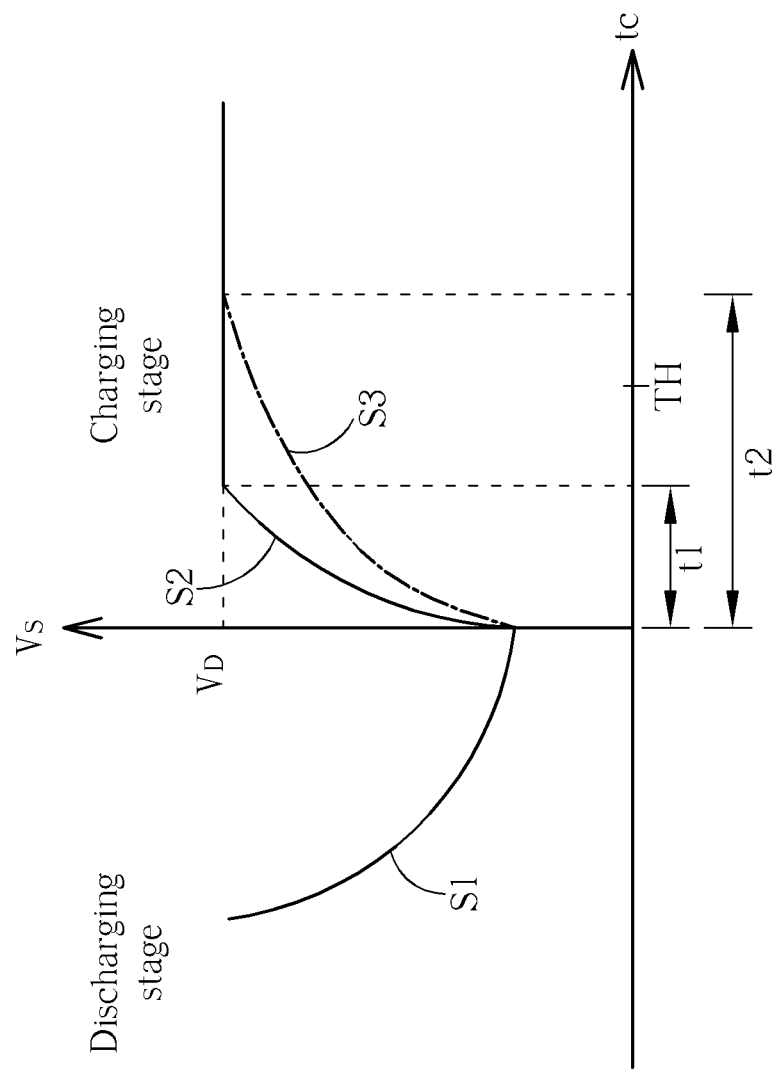
FIG. 4 illustrates a signal waveform of a sensing voltage detected by the detecting unit shown in FIG. 3 during discharging stage and charging stage (including scenarios of receiving a touch from a user and not receiving a touch from a user).

Please jointly refer to FIG. 4 and FIG. 3. FIG. 4 illustrates a signal waveform of the sensing voltage VS detected by the detecting unit 340 shown in FIG. 3 during a discharging stage and a charging stage (including scenarios of receiving a touch from a user and not receiving a touch from a user). First, the detecting unit 340 performs an initialization operation, so as to discharge the conductive layer of the sensing unit 110 through a discharging path during the discharging stage, as a first curve 51 shown in FIG. 4. Then, the charging stage is narrated by the following two scenarios. In the first scenario, the ear or face of the user does not contact the sensing unit 110 of the electronic device 100/200 (i.e. the sensing unit does not receive a touch from the user). Since the control unit 330 provides the periodic pulses SPP to the sensing unit 110 and the charge-and-discharge circuit 310, the sensing unit 110 and the charge-and-discharge circuit 310 are charged and discharged periodically, and the equivalent capacitance of the charge-and-discharge circuit 310 and the sensing unit 110 equals Ccharge+C1. Therefore, the sensing voltage VS detected by the detecting unit 340 is charged to the predetermined voltage VD within a time period t1, as a second curve S2 shown in FIG. 4. In the second scenario, the ear or face of the user contacts the sensing unit 110 of the electronic device 100/200 (i.e. the sensing unit 110 receives a touch from the user). Since the equivalent capacitance of the charge-and-discharge circuit 310 and the sensing unit 110 is changed in response to the touch of the user (at this moment, the equivalent capacitance equals Ccharge+C2), the charging time tc required for the sensing voltage VS to reach the predetermined voltage VD is changed. As a result, the sensing voltage VS detected by the detecting unit 340 is charged to the predetermined voltage VD after a time period t2, as a third curve S3 shown in FIG. 4.

In brief, in the scenario that the ear or face of the user does not contact the sensing unit 110 of the electronic device 100/200, the sensing voltage VS detected by the detecting unit 340 is charged to the predetermined voltage VD within the time period t1, and the determining unit 350 (such as a comparator) compares the charging time tc with a threshold TH. Since the charging time tc is not greater than the threshold value TH (tc=t1<TH), the determining unit 350 does not trigger the interrupt request INT, and the executing unit 360 does not execute the specific application AP. In the scenario that the ear or face of the user contacts the sensing unit 110 of the electronic device 100/200, the sensing voltage VS detected by detecting unit 340 is charged to the predetermined voltage VD after the time period t2, and the determining unit 350 also compares the charging time tc with the threshold TH. Since the charging time tc is greater than the threshold TH (tc=t2>TH), the determining unit 350 triggers the interrupt request INT, and thus, the executing unit 360 executes the specific application AP. As a result, the electronic device 100/200 can utilize the sensing unit 110 together with the simple charge-and-discharge circuit 310 and the processing circuit 320 to achieve the function of automatically turning off the touch panel and/or backlight of the display panel (i.e. to execute the specific application AP), so as to improve additional functions of the electronic device 100/200 and bring more convenience to the user.

Figure 5:
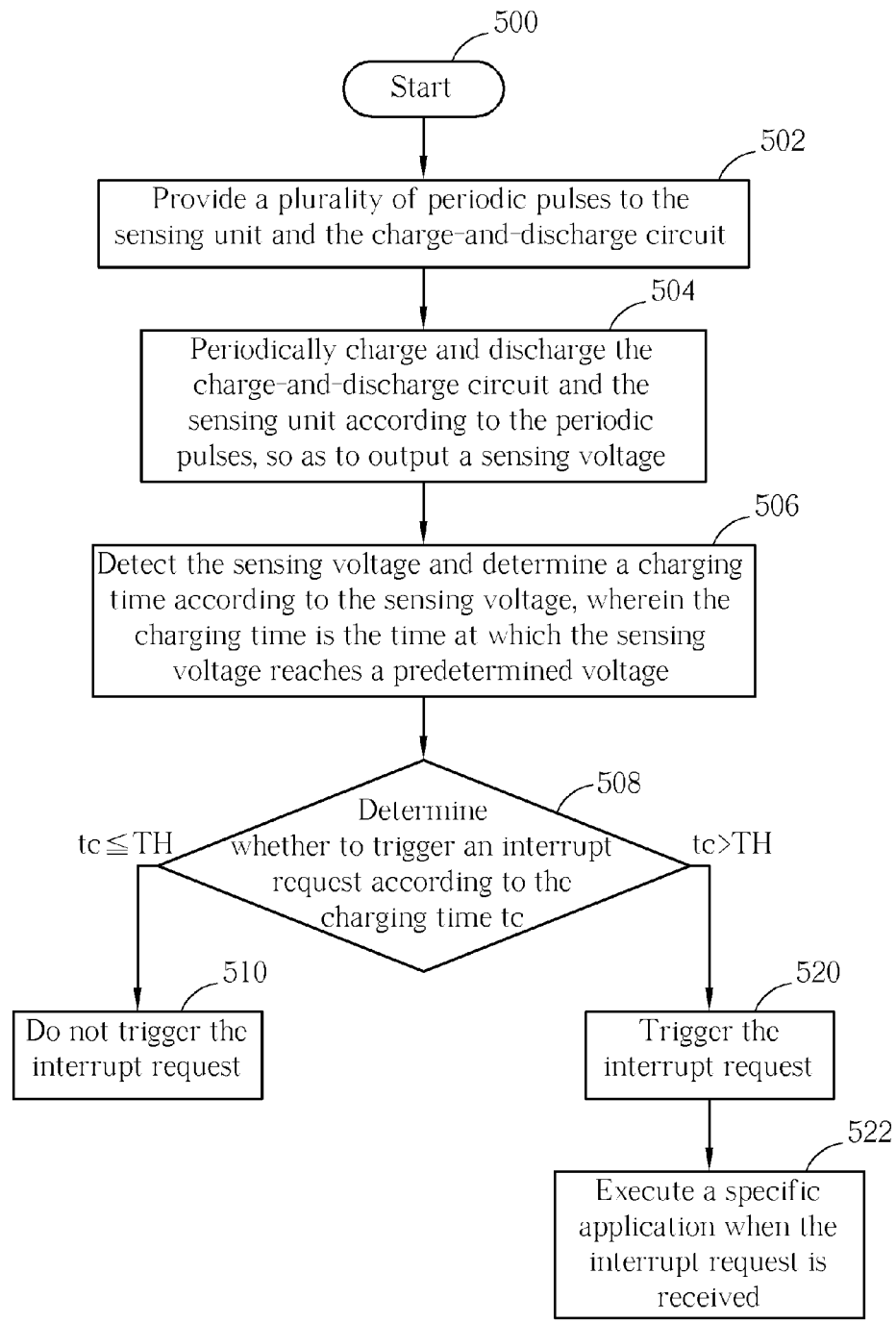
FIG. 5 illustrates a flow chart of an operating example of a method for controlling an electronic device according to the present disclosure.

Please refer to FIG. 5, which illustrates a flow chart of an operating example of a method for controlling an electronic device according to the present invention. The electronic device comprises a sensing unit and a charge-and-discharge circuit. The method comprises the following steps (note that, if a similar result can be acquired, the following steps are not necessary to be executed according to the sequence shown in FIG. 5):

Step 500: Start.

Step 502: Provide a plurality of periodic pulses to the sensing unit and the charge-and-discharge circuit.

Step 504: Periodically charge and discharge the charge-and-discharge circuit and the sensing unit according to the periodic pulses, so as to output a sensing voltage.

Step 506: Detect the sensing voltage and determine a charging time according to the sensing voltage, wherein the charging time is the time at which the sensing voltage reaches a predetermined voltage.

Step 508: Determine whether to trigger an interrupt request according to the charging time. If the charging time is greater than a threshold, execute Step 520; otherwise, execute Step 510.

Step 510: Do not trigger the interrupt request.

Step 520: Trigger the interrupt request.

Step 522: Execute a specific application when the interrupt request is received.

As to operations of the steps shown in FIG. 5, please refer to the elements shown in FIG. 1 (or FIG. 2), FIG. 3, and the signal waveform shown in FIG. 4, so as to understand operations between elements. For clarity, the operations of the steps shown in FIG. 5 are not narrated hereinafter. Specifically, Step 510 denotes the scenario that the sensing unit 110 does not receive a touch from a user, and Steps 520-522 denote the scenario that the sensing unit 110 receives a touch from a user.

The steps of the above process are examples for illustrating the present invention, and are not limited thereto. Without violating the main spirit of the present invention, the method can further comprise other middle steps or a plurality of steps can be combined into a single step, to realize alterations appropriately.

The above embodiments are only used to illustrate technique features of the present invention, and do not limit the scope of the present invention. As can be seen from above, the present invention provides an electronic device and a control method thereof. By using a sensing unit (which can be implemented by a conductive layer disposed at a position adjacent to a place where outputs sound) together with a simple charge-and-discharge circuit and a processing circuit, the electronic device can sense whether the ear or face of the user approaches the electronic device (i.e. whether the sensing unit receives a touch from the user). As a result, the electronic device can reduce an original proximity sensor but automatically turn off a touch panel and/or backlight of a display panel. Since the shape and size of the conductive material is not limited, an area of the conductive layer can be increased to increase sensing range, to avoid sensing failures. Besides, since the sensing unit is not an optical element, the specific area where the sensing unit is disposed can be covered by a layer of colored material, to coincide surface color of the electronic device and to reach requirements of artistic appearance. Moreover, since the cost of the conductive layer (e.g. copper sheet) is low, the production cost can be further decreased and more additional functions can be provided, to bring more convenience to users.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A mobile phone, comprising:
   a display panel;
   a touch panel;
   a sound output device;
   a housing means with a containing space to contain the sound output device, wherein the housing means has an inner surface;
   a conductive layer disposed on the inner surface of the housing means and adjacent to the sound output device and used for sensing a touch during a phone call and turning off the touch panel or backlight of the display panel when the touch is sensed;
   a charge-and-discharge circuit coupled to the conductive layer, wherein the charge-and-discharge circuit and the conductive layer are charged and discharged periodically according to a plurality of periodic pulses and output a sensing voltage; and
   a processing circuit coupled to the conductive layer and the charge-and-discharge circuit, comprising:
      a control unit for providing the periodic pulses to the conductive layer and the charge-and-discharge circuit;
      a detecting unit for detecting the sensing voltage and deciding a charging time according to the sensing voltage, wherein the charging time is a time at which the sensing voltage reaches a predetermined voltage;
      a determining unit coupled to the detecting unit for deciding whether to trigger an interrupt request according to the charging time; and
      an executing unit coupled to the determining unit for turning off the touch panel or backlight of the display panel when the interrupt request is received;
   wherein the housing means is a cover plate with a cavity forming the containing space to contain the sound output device;
   wherein the conductive layer is disposed on a specific area of the inner surface of the housing means, and the specific area is adjacent to the cavity and is covered by a layer of colored material.

2. The mobile phone of claim 1, wherein the charge-and-discharge circuit comprises a charging capacitor.

3. The mobile phone of claim 1, wherein the conductive layer comprises a virtual capacitor, and when the conductive layer receives the touch from the object, the capacitance of the virtual capacitor changes.

4. The mobile phone of claim 1, wherein the determining unit compares the charging time with a threshold, triggers the interrupt request when the charging time is greater than the threshold, and does not trigger the interrupt request when the charging time is not greater than the threshold.

5. The mobile phone of claim 1, wherein the housing means is a housing with the containing space to contain the sound output device.

6. The mobile phone of claim 1, wherein the conductive layer is a metal sheet.

* * * * *